United States Patent
O'Rourke et al.

(10) Patent No.: US 11,279,230 B2
(45) Date of Patent: Mar. 22, 2022

(54) MANUAL TORQUE VECTORING

(71) Applicant: FORD GLOBAL TECHNOLOGIES, LLC, Dearborn, MI (US)

(72) Inventors: Ryan O'Rourke, Dearborn, MI (US); Mark Thomas Weston, Livonia, MI (US); Keith Weston, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 49 days.

(21) Appl. No.: 16/939,839

(22) Filed: Jul. 27, 2020

(65) Prior Publication Data
US 2022/0024306 A1    Jan. 27, 2022

(51) Int. Cl.
| B60K 23/04 | (2006.01) |
| B60K 23/08 | (2006.01) |
| B62D 1/04  | (2006.01) |
| B62D 6/00  | (2006.01) |

(52) U.S. Cl.
CPC .......... B60K 23/0808 (2013.01); B62D 1/046 (2013.01); B62D 6/007 (2013.01); B60K 2023/043 (2013.01)

(58) Field of Classification Search
CPC .......... B60K 23/0808; B60K 2023/043; B62D 6/007; B62D 1/046
See application file for complete search history.

(56) References Cited

U.S. PATENT DOCUMENTS

| 9,868,349 | B2 | 1/2018 | Pritchard et al. |
| 10,773,708 | B2* | 9/2020 | Ruybal ........... B60W 30/18127 |
| 2011/0269592 | A1 | 11/2011 | Klomp |
| 2014/0296028 | A1 | 10/2014 | Joeng |
| 2020/0324649 | A1* | 10/2020 | Gully ................. B60R 16/0231 |
| 2021/0323402 | A1* | 10/2021 | Stock .................... B60K 17/02 |

FOREIGN PATENT DOCUMENTS

| CN | 111391842 A | * | 7/2020 | ............ F16H 48/36 |
| CN | 113316536 A | * | 8/2021 | |

* cited by examiner

*Primary Examiner* — Justin Holmes
(74) *Attorney, Agent, or Firm* — David B. Kelley; Brooks Kushman P.C.

(57) ABSTRACT

A vehicle includes an axle having left and right wheels. The vehicle further includes left and right torque-vector control devices each having an actuator with a released position, a fully actuated position, and a plurality of intermediate positions. A vehicle controller is programmed to, in response to the vehicle turning and one of the actuators being actuated, command different torques to the left and right wheels to produce torque vectoring between the wheels, wherein a difference between the torques commanded to the wheels increases as the actuator moves toward the fully actuated position and decreases as the actuator moves toward the fully released position.

19 Claims, 5 Drawing Sheets

MANUAL TORQUE VECTORING

TECHNICAL FIELD

The present disclosure relates to torque vectoring and more particularly to manually engaging torque vectoring.

BACKGROUND

Vehicles such as fully electric vehicles and hybrid-electric vehicles contain a traction-battery assembly to act as an energy source for the vehicle. The traction battery may include components and systems to assist in managing vehicle performance and operations. The traction battery may also include high-voltage components, and an air or liquid thermal-management system to control the temperature of the battery. The traction battery is electrically connected to an electric machine that provides torque to driven wheels. Electric machines typically include a stator and a rotor that cooperate to convert electrical energy into mechanical motion or vice versa.

SUMMARY

According to one embodiment, a vehicle includes an axle having left and right wheels, a steering wheel, left and right driver-actuatable inputs operable to request left-side and right-side torque vectoring, and a controller. The controller is programmed to, in response to the steering wheel being turned left and a driver requesting left-side torque vectoring via the left input, (i) calculate a first torque differential between the left and right wheels based on steering angle, accelerator-pedal position, vehicle speed, and yaw rate, and (ii) command torque to the left and right wheels based on the first torque differential. The controller is further programmed to, in response to the steering wheel being turned right and the driver requesting right-side torque vectoring via the right input, (i) calculating a second torque differential between the left and right wheels based on steering angle, accelerator-pedal position, vehicle speed, and yaw rate, and (ii) command torque to the left and right wheels based on the second torque differential.

According to another embodiment, a vehicle includes an axle having left and right wheels. The vehicle further includes left and right torque-vector control devices each having an actuator with a released position, a fully actuated position, and a plurality of intermediate positions. A vehicle controller is programmed to, in response to the vehicle turning and one of the actuators being actuated, command different torques to the left and right wheels to produce torque vectoring between the wheels, wherein a difference between the torques commanded to the wheels increases as the actuator moves toward the fully actuated position and decreases as the actuator moves toward the fully released position.

According to yet another embodiment, a vehicle includes a rear axle having wheels, friction brakes associated with the wheels, and a driver-actuatable input. A vehicle controller is programmed to, in response to the vehicle being in drift mode and the driver-actuatable input being actuated: command zero torque to the wheels, regardless of a driver-demanded torque, for a duration of time; command engagement of the friction brakes responsive to the duration of time ending; and command torque to the wheels responsive to a speed of the wheels being less than a threshold.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
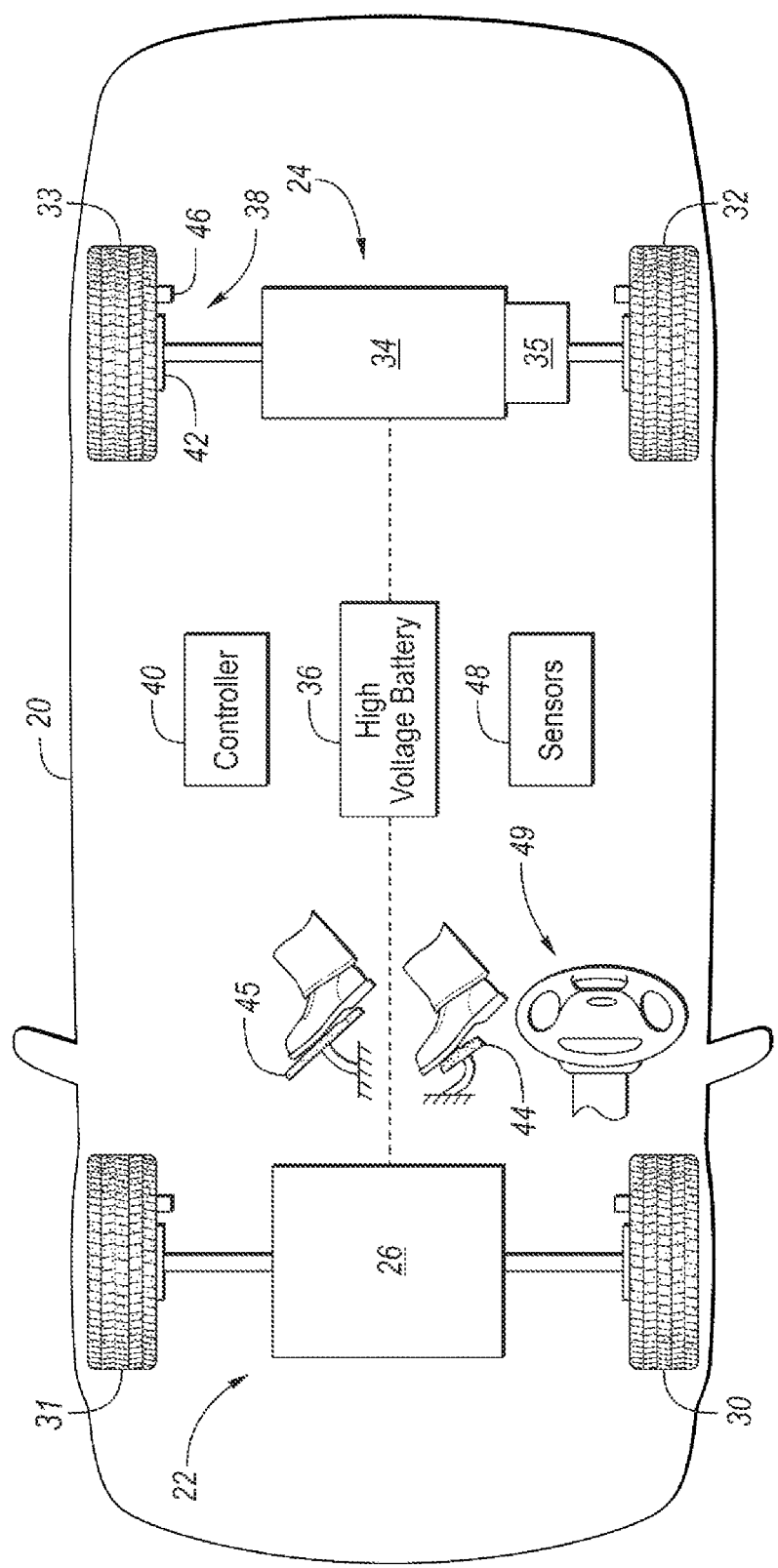
FIG. 1 is a schematic diagram of an electric machine according to one embodiment.

Referring to FIG. 1, an electrified vehicle 20 is illustrated as a fully electric vehicle but, in other embodiments, the electrified vehicle 20 may be a hybrid-electric vehicle that includes an internal-combustion engine or a conventional vehicle only having an engine. The vehicle 20 has electric all-wheel drive (AWD). The vehicle 20 may include a primary drive axle 24 and a secondary drive axle 22. In the illustrated embodiment, the primary drive axle 24 is the rear axle and the secondary drive axle 22 is the front axle. In other embodiments, the front axle may be the primary drive and the rear axle may be the secondary drive. The primary and secondary axles may include their own powerplant, e.g., an engine and/or an electric machine, and are capable of operating independently of each other or in tandem to accelerate (propel) or brake the vehicle 20.

The secondary drive axle 22 may include at least one powerplant, e.g., electric machine 26, operable to power the wheels 30 and 31. A gearbox (not shown) may be included to change a speed ratio between the wheels 30, 31 and the powerplant(s). The gearbox may be a one-speed direct drive or a multi-speed gearbox. The primary drive axle 24 may include at least one powerplant, e.g., an electric machine 34, that is operably coupled to the wheels 32 and 33. A gearbox (not shown) may be included change a speed ratio between the powerplant(s) 34 and the wheels 32, 33.

The electric machines 28, 34 are capable of acting as motors to propel the vehicle 20 and are capable of acting as generators to brake the vehicle via regenerative braking. In one or more embodiments, the electric machines 28, 34 are permanent magnet synchronous alternating current (AC) motors or other suitable type.

The electric machines 28, 34 are powered by one or more traction batteries, such as traction battery 36. The traction battery 36 stores energy that can be used by the electric machines 28, 34. The traction battery 36 typically provides a high-voltage direct current (DC) output from one or more battery cell arrays, sometimes referred to as battery cell stacks, within the traction battery 36. The battery cell arrays include one or more battery cells. The battery cells, such as a prismatic, pouch, cylindrical, or any other type of cell, convert stored chemical energy to electrical energy. The cells may include a housing, a positive electrode (cathode), and a negative electrode (anode). An electrolyte allows ions to move between the anode and cathode during discharge, and then return during recharge. Terminals may allow current to flow out of the cell for use by the vehicle 20. Different battery pack configurations may be available to address individual vehicle variables including packaging constraints and power requirements. The battery cells may be thermally regulated with a thermal management system.

The traction battery 36 may be electrically connected to one or more power-electronics modules through one or more contactors. The module may be electrically connected to the electric machines 28, 34 and may provide the ability to bi-directionally transfer electrical energy between the traction battery 36 and the electric machines 28, 34. For example, a typical traction battery 36 may provide a DC voltage while the electric machines 28, 34 may require a three-phase AC voltage to function. The power-electronics module may convert the DC voltage to a three-phase AC voltage as required by the electric machines. In a regenerative mode, the power-electronics module may convert the three-phase AC voltage from the electric machines 28, 34 acting as generators to the DC voltage required by the traction battery 36.

The vehicle 20 includes a controller 40 that is in electronic communication with a plurality of vehicle systems and is configured to coordinate functionality of the vehicle. The controller 40 may be a vehicle-based computing system that includes one or more controllers that communicate via a serial bus (e.g., controller area network (CAN)) or via dedicated electrical conduits. The controller 40 generally includes any number of microprocessors, ASICs, ICs, memory (e.g., FLASH, ROM, RAM, EPROM and/or EEPROM) and software code to co-act with one another to perform a series of operations. The controller 40 also includes predetermined data, or "lookup tables" that are based on calculations and test data, and are stored within the memory. The controller 40 may communicate with other vehicle systems and controllers over one or more wired or wireless vehicle connections using common bus protocols (e.g., CAN and LIN). Used herein, a reference to "a controller" refers to one or more controllers. The controller 40, in one or more embodiments, any include any of the follow control modules: a battery energy control module (BECM) that operates at least the traction battery, an engine control module (ECM) that operates at least the engine, a powertrain control module (PCM) that operates at least the electric machines, the gearboxes, and the differential(s), and an ABS control module that controls the anti-lock braking system (ABS) 38.

The ABS 38, while illustrated as a hydraulic system, may be electronic or a combination of electronic and a hydraulic. The ABS 38 may include a brake module and a plurality of friction brakes 42 located at each of the wheels. Modern vehicles typically have disc brakes; however, other types of friction brakes are available, such as drum brakes. Each of the brakes 42 are in fluid communication with the brake module via a brake line configured to deliver fluid pressure from the module to a caliper of the brakes 42. The module may include a plurality of valves configured to provide independent fluid pressure to each of the brakes 42. The brake module may be controlled by operation of a brake pedal 44 and/or by the vehicle controller 40 without input from the driver. The ABS system 38 also includes associated wheel-speed sensors 46 each located on one of the wheels. Each sensor 46 is configured to output a wheel-speed signal to the controller 40 indicative of a measured wheel speed.

The vehicle 20 is configured to slow down using regenerative braking, friction braking, or a combination thereof. The controller 40 includes programming for aggregating a demanded braking torque between regenerative braking, i.e., the electric machines, and the friction brakes 42. The demanded braking torque may be based on driver input, e.g., a position of the brake pedal 44 or a hand-operated actuator, or by the controller 40. The aggregator of the controller 40 may be programmed to prioritize regenerative braking whenever possible.

The vehicle 20 includes an accelerator pedal 45. The accelerator pedal 45 includes a range of travel from a released position to a fully depressed position and indeterminate positions therebetween. The accelerator pedal 45 includes an associated sensor (not shown) that senses the position of the pedal 45. The sensor is configured to output a pedal-position signal to the controller 40 that is indicative of a sensed position of the pedal 45. The accelerator pedal 45 is used by the driver to command a desired speed of the vehicle. Under normal conditions, the accelerator pedal 45 is used by the driver to set a driver-demanded torque. The controller 40 may be programmed to receive the pedal-position signal and determine the driver-demanded torque based on pedal position and other factors.

The vehicle 20 may include one or more sensors 48 configured to determine accelerations of the vehicle. For example, the sensors 48 may include a yaw-rate sensor, a lateral-acceleration sensor, and a longitudinal-acceleration sensor. Used herein, "acceleration" refers to both positive acceleration (propulsion) and negative acceleration (braking). The yaw-rate sensor generates a yaw-rate signal corresponding to the yaw rate of the vehicle. Using the yaw-rate sensor, the yaw acceleration may also be determined. The lateral-acceleration sensor outputs a lateral-acceleration signal corresponding to the lateral acceleration of the vehicle. The longitudinal-acceleration sensor generates a longitudinal-acceleration signal corresponding to the longitudinal acceleration of the vehicle. The various sensors are in communication with the controller 40. In some embodiments, the yaw rate, lateral acceleration, longitudinal acceleration, and other measurements may be measured by a single sensor.

The vehicle 20 may also include a steering system 49 that turns the front wheels 30, 31. The steering system 49 may include a steering wheel connected to a steering shaft that actuates a steering box, such as a rack-and-pinion assembly. The steering box is operably coupled to the front wheels 30, 32 and turns the wheels according to inputs from the steering wheel. The steering system 49 may include one or more sensors configured to output a signal indicative of steering angle to the controller 40. The steering sensor may measure rotation of the steering shaft or movement of another component(s).

Electric all-wheel drive vehicles, e.g., vehicle 20, utilize independent propulsion devices, e.g., electric machines, at each axle enabling independent control of the torque at each axle. As such, the vehicle can dynamically adjust the front-rear torque split in order to maximize traction, handling performance, and the like. One benefit of electric AWD is that the electric machines can change the torque delivery more quickly and accurately than an internal-combustion engine. As a result, the electric machines can allow for precise control of each axle. The speed of the electric machine directly reflects the average speed of the wheels on each axle. Therefore, the average wheel speed of each axle can be controlled by actively controlling the electric-machine speed at each axle to propel the vehicle at a driver-demanded speed. As will be described in more detail below, the individual wheels of at least one of the axles, or both in some embodiments, can be independently controlled to enable torque vectoring. In the illustrated embodiment, the rear axle 24 includes a special differential 35 capable of individually controlling the torque to each wheel between zero and 100 percent. The differential 35 includes an input operably coupled the electric machine 34 and a pair of outputs connected the wheels 32, 33 respectively. The differential 35 may include clutches, for example, each associated with one of the wheels. The clutches are controller to selectively couple the wheels to the input. Capacity of the clutches can be varied to route torque to the wheels between zero and 100 percent. Clutches, are of course, merely one embodiment and any suitable design may be used. The front axle 22 may also include a differential similar to differential 35, or equivalent device, to control torque individually to the wheels 30, 31. That is, the vehicle 20 may include torque vectoring for the rear wheels, the front wheels, or both.

Figure 2:
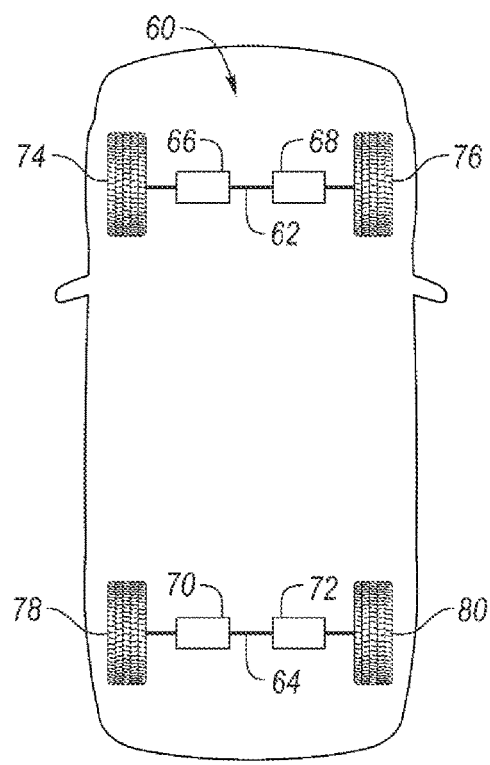
FIG. 2 is a schematic diagram of an electric machine according to another embodiment.

FIG. 2 illustrates another vehicle architecture contemplated by this disclosure. A vehicle 60 may be an all-wheel-drive vehicle in which both the front axle 62 and the rear axle 64 are powered by electric machines. In the illustrated embodiment, the vehicle 60 may include four electric machines 66, 68, 70, and 72, one associated with each of the wheels 74, 76, 78, and 80. The electric machines may be referred to as wheel motors. Each of the electric machines as independently controllable so that the vehicle 60 can command independent speeds to each of the wheels. This enables the vehicle 62 to have torque vectoring at both the front and rear axles 62, 64. Having an electric machine associated with each wheel eliminates the need for complex differentials or similar devices.

In other embodiments, the vehicle 60 may only be two-wheel drive, such as front-wheel-drive or rear-wheel drive. In a front-wheel drive configuration, the rear motors 70 and 72 are eliminated, and in a rear-wheel drive configuration, the front motor 66 and 68 are eliminated.

In another embodiment, the vehicle 60 may be all-wheel-drive but only one axle may include individual wheel motors. For example, the front axle may be powered by a single electric machine (similar to that shown in FIG. 1) whereas the rear axle is powered by electric machine 70 and 72. This could also be switched, with the front axle continuing to include motors 66 and 68 and the rear axle including a single motor.

This disclosure also contemplates vehicles with hybrid and conventional powertrains that include, as at least one of the powerplants, an internal combustion engine. These vehicles may include a differential(s), similar to differential 35, configured to output torque individually to the wheels of at least one axle.

Torque vectoring is an automotive technology that allows variable torque to be delivered to individual wheels of a common axle. As discussed above, torque vectoring capability can be accomplished through special types of differentials or through wheel motors. Torque vectoring is typically used to facilitate cornering or to enable "drifting." When a vehicle corners, the outside wheel rotates faster than the inside wheel. Torque vectoring leverages this and intentionally increases the speed differential between the inner and outer wheels allowing the vehicle to corner sharper. The speed differential is induced by changing a torque differential between the wheels, i.e., more torque is applied to the outside wheel and less torque is applied to the inside wheel. The torque differential can be accomplished by increasing the torque to the outside wheel, decreasing the torque to the inside, braking the inside wheel, or combinations thereof.

Referring back to FIG. 1, the controller 40 is programmed to provide torque vectoring. Relevant controller inputs for torque vectoring may include yaw-rate, lateral acceleration, longitudinal acceleration, vehicle speed, accelerator-pedal position, brake-pedal position, driver demanded torque, torque available, steering wheel angle, coefficient of friction calculation and driver input based on paddle position or force, and the like. Generally, the controller 40 may include a plurality of lookup tables that output a wheel-torque differential (for all relevant axles) based on sensed conditions. The wheel-torque differential is used to determine the proportion of torque routed to the individual wheels. During a right turn, for example, the controller 40 may determine a torque split of 60-40 for the rear axle 24 and the motor 34 may be producing torque such the input of the differential 35 receives 100 Newton meters (Nm) of torque. The differential 35 is controlled to send 60 Nm to the left (outside) wheel 32 and 40 Nm to the right (inside) wheel 33. According to one or more embodiments, the controller 40 may control the differential 35 by commanding specific pressures to the clutch packs. In this embodiment, the calculated wheel-torque differential is converted into pressure commands for the clutches of the differential 35. In other embodiments, the torque differential is divided between the pair of motors for the axle, i.e., the motor associated with wheel 32 is commanded to produce 60 Nm of torque in the motor associated with the right wheel 33 is commanded to produce 40 Nm of torque.

Typically, torque vectoring is controlled solely by the controller(s) of the vehicle and the driver is not permitted to request or deny torque vectoring. To increase driver involvement, the vehicle 20 is configured to enable the driver to manually control torque vectoring. The vehicle 20 may also be programmed to automatically control torque vectoring depending upon different operating modes of the vehicle or driver-selectable option. For example, the vehicle may include a normal driving mode in which torque vectoring is automatically controlled by the controller 40, and may include another driving mode, such as sport mode or track mode, in which the driver is able to manually control torque vectoring. The driver control of torque vectoring may be ON/OFF or may also include the amount (or aggressiveness) of the torque vectoring. That is, the driver may actuate an ON/OFF input that results in the vehicle activating the torque vectoring controls, or alternatively, the driver may actuate a variable input in which the torque vectoring controls increase or decrease the amount of torque differential based on the position of the variable input. The advent of electrified vehicles has reduced driver interaction, mostly through the elimination of the transmission, and providing manually controlled torque vectoring is one way to increase the driver interaction for electric vehicles. This may provide a more satisfying driving experience on the track or other closed course.

Figure 3:
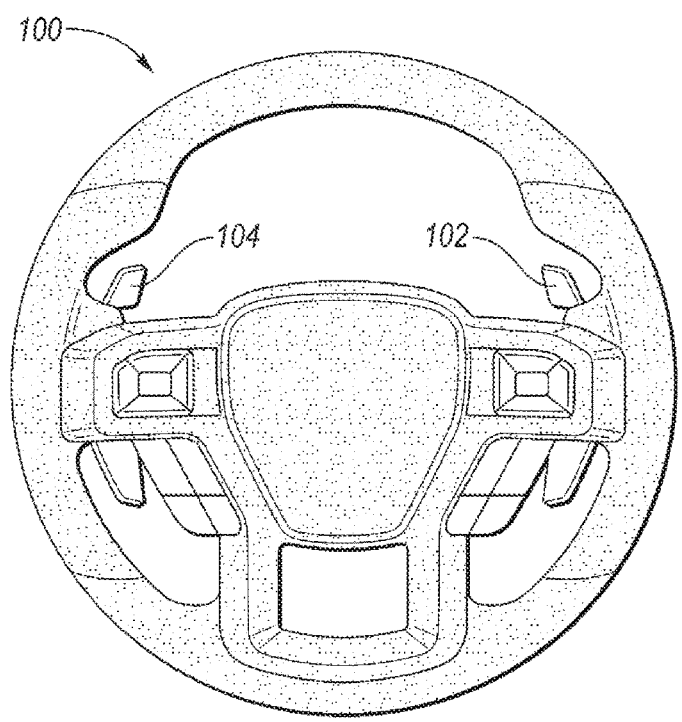
FIG. 3 is a perspective view of a steering wheel having torque-vectoring control devices.

Referring to FIG. 3, the torque-vectoring control devices may be mounted on a steering wheel 100 or any other location that is easily assessable to the driver. The torque-vectoring controls are driver-actuatable inputs operable to request left-side and right-side torque vectoring, respectively. In the illustrated embodiment, the inputs are paddles 102 and 104. The paddles 102 and 104 may be mounted on a backside of the steering wheel 100 or may be mounted to the steering column (not shown). The paddles 102, 104 each include an associated sensor configured to sense actuation of the paddles and output a signal, e.g., a paddle-position signal, to the controller 40 indicative of an actuation state, e.g., a position, of the paddle.

In one embodiment, the paddles are ON/OFF switches that the driver can use to request torque vectoring. In response to the driver request, the controller 40 executes the torque vectoring controls that may be continuously operating behind the scenes. In this embodiment, the driver is only able to ask for torque vectoring, or not, and it is the purview of the vehicle controller to determine the amount of vectoring based on sensed conditions as discussed above.

Figure 4:
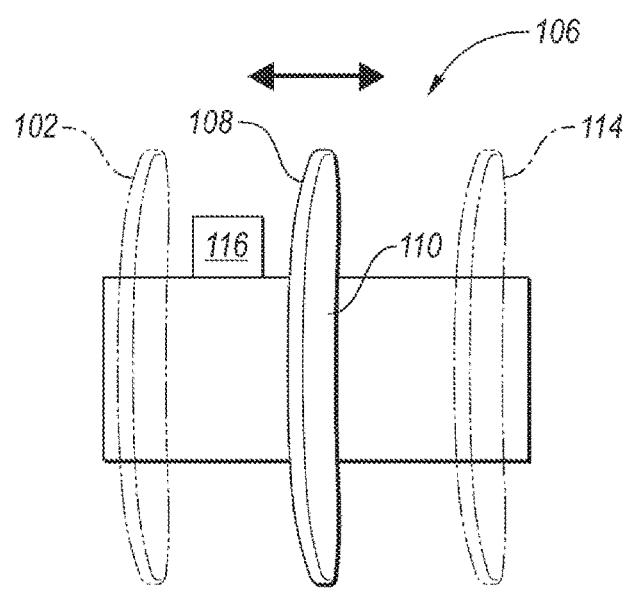
FIG. 4 is a schematic diagram of a variable-position torque-vectoring control device.

Referring to FIG. 4, to provide even more driver interaction, the paddles may have a range of positions in other embodiments allowing the driver to not only command activation of torque vectoring but also the amount. Here, an example paddle assembly 106 includes a paddle (an actuator) 108 connected to a guide member 110 that is movable through a range of positions including a fully released position 112, a fully actuated position 114, and a plurality of intermediate positions 108. The sensor 116 senses movement of the guide member 110 and outputs a signal to the controller 40 indicative of the position of the paddle assembly 106.

The position of the paddle assembly 106 may be correlated into a percentage of requested torque vectoring. The vehicle may calculate a baseline torque vectoring value based on sensed conditions. The paddle assembly 106, in addition to ON/OFF, operates to scale the amount of torque vectoring up, down, or a combination of both. In one embodiment, the position of the paddle 108 represents a percentage of the baseline torque vectoring to be applied. When the paddle 108 is fully pulled, the vehicle commands 100 percent of the baseline torque vectoring. When the paddle 108 is in an intermediary position, the baseline vectoring is multiplied by a percentage of actuation resulting in less torque vectoring. In another embodiment, the driver may be able to request more torque vectoring than the baseline torque vectoring. Here, one of the intermediate positions represents a request for 100% of the baseline vectoring. Actuation of the paddle 100 beyond this point results in increased torque vectoring and actuating less than this point produces less torque vectoring compared to the baseline. FIG. 4 is merely one embodiment of a variable-position torque-vectoring control device and other forms are contemplated.

Figure 5:
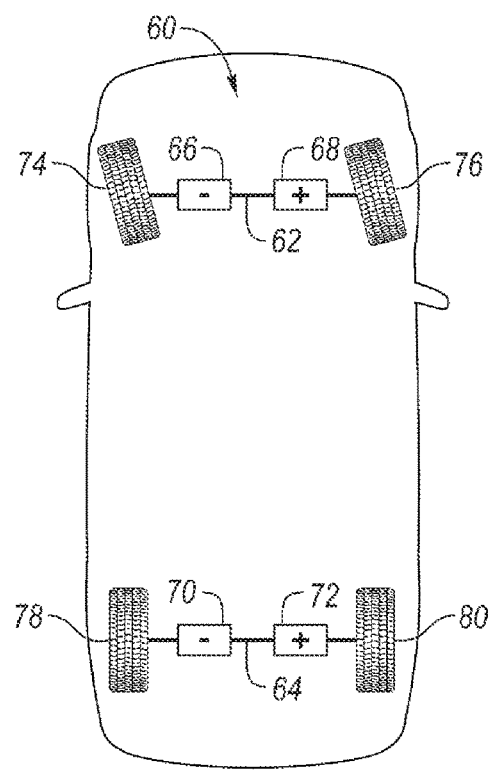
FIG. 5 is a schematic diagram of the vehicle of FIG. 2 applying torque vectoring during a left turn.

FIG. 5 illustrates the vehicle 60 during a left-hand turn. In this example, the driver has pulled the paddle 104 to request torque vectoring. In response, the controller 40 calculates a torque differential between the wheel 74 and 76 and between the wheels 78 and 80. In this example, the torque vectoring is aggressive resulting in regenerative braking being commanded to the motors 66 and 70 and a positive torque being commanded to the motors 68 and 72. In a less aggressive example, the motor 66 and 70 may coast or provide positive torque, albeit less than the motors 68 and 72. Torque vectoring does not have to occur at both the front and the rear axles. Depending on the desired vehicle characteristics and vehicle attributes, torque vectoring may occur only at the rear axle or only at the front axle. The inner wheels can also be braked using the friction brakes.

Figure 6:
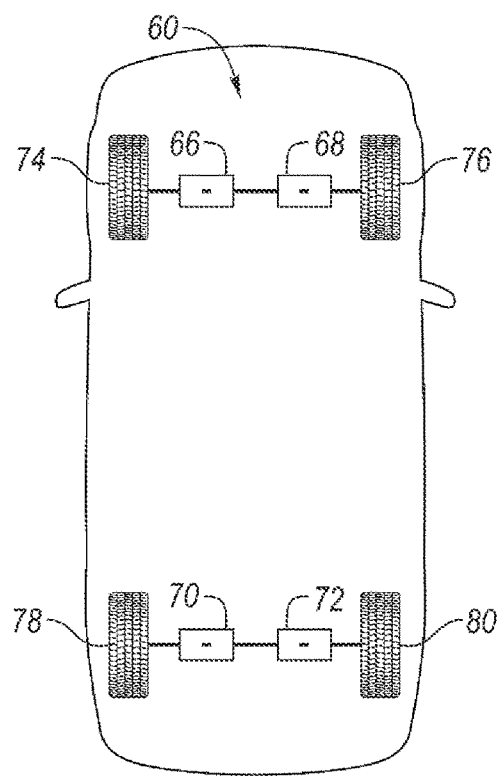
FIG. 6 is a schematic diagram of the vehicle of FIG. 2 manually applying regenerative braking using torque-vectoring control devices.

Referring to FIG. 6, the torque-vectoring control devices can also be used by the driver to request regenerative braking. The driver can request regenerative braking by pulling both the left and right torque-vectoring control devices, e.g. pulling both the left to right paddles 104, 102. In response to both battles being pulled, the controller 40 commands a negative (regenerative) torque to the electric machine 66, 68, 70, and 72. The amount of regenerative torque commanded is a calibrated value and can be tuned to provide more or less aggressive regenerative braking. The amount of regenerative braking may also be based on vehicle speed, battery state of charge, and other sensed conditions as known in the art. If variable position paddles are provided, the driver and modulate the paddles to increase and decrease the negative torque.

Figure 7:
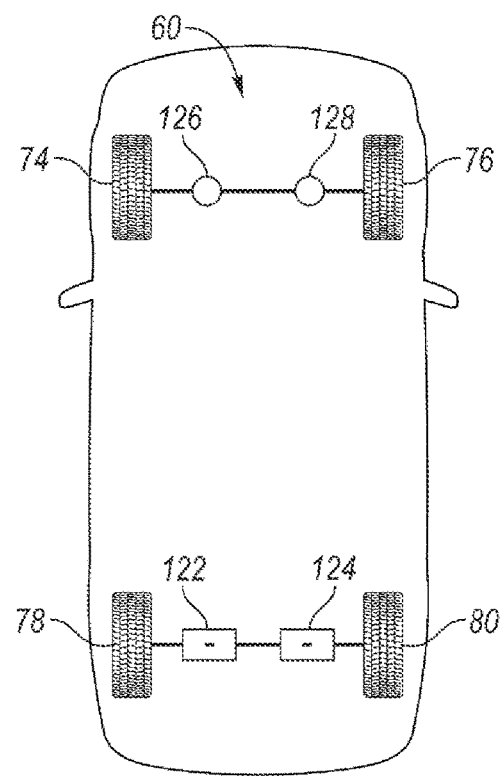
FIG. 7 is a schematic diagram of another vehicle manually applying regenerative braking using torque-vectoring control devices.

FIG. 7 illustrates the paddle-requested regenerative braking on a vehicle 120 with only a rear electric axle. In this embodiment, actuating both the left and right paddles 104, 102 (or other input) results in the controller commanding regenerative braking to the motors 122 and 124 and to command friction braking to the front friction brakes 126 and 128.

Control logic or functions performed by controller 40 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 40. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 8:
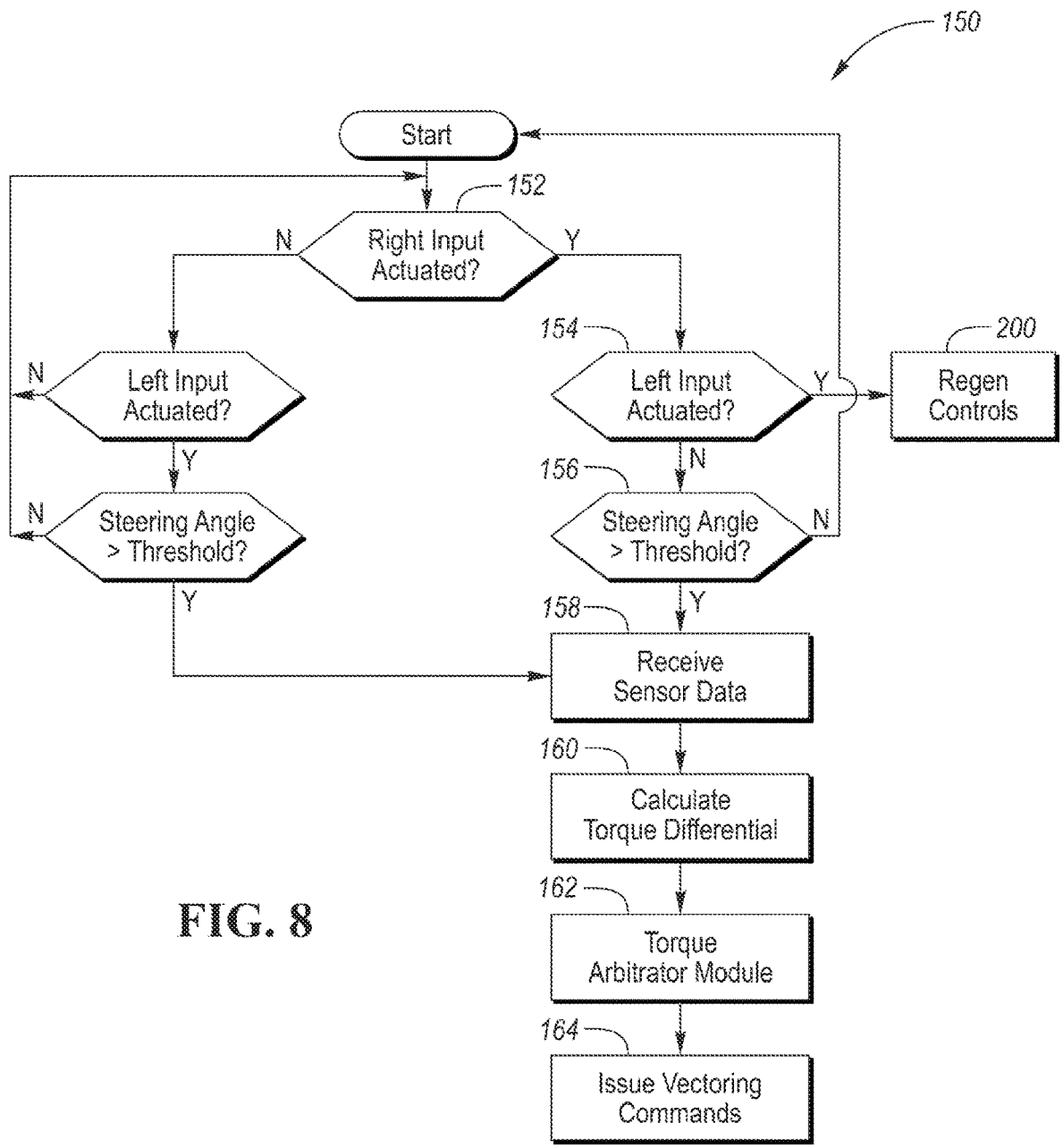
FIG. 8 is a flow chart of an algorithm for controlling manually activated torque vectoring.

FIG. 8 is a flowchart 150 of an algorithm for controlling manual torque vectoring according to one or more embodiments. The controls begin in response to one of the torque-vectoring control devices being actuated by the driver. At operation 152, the controller determines if the right input is actuated. If yes, control passes operation 154, and the controller determines if the left input is actuated. If yes, the driver is requesting regenerative braking and control passes to regenerative-braking controls 200. (The regenerated braking controls will be described in detail below.) At operation 156, the controller determines if the steering angle is greater than a threshold, i.e., is the driving making a right-hand turn? If the driver is not turning the vehicle to the right, or is not turning by a sufficient amount, torque vectoring does not occur. In other embodiments, operation 156 may be omitted. A YES at operation 156 establishes that torque vectoring is going to be commanded. Operations 158 through 164 determine the amount of torque vectoring. Similar controls are provided for the left input and will not be discussed for brevity.

At operation 158, the controller receives data from various sensors of the vehicle. The data may include steering angle, accelerator-pedal position, brake-pedal position, motor torque, motor speed, engine torque, vehicle speed, yaw rate, lateral and longitudinal acceleration, braking torque, traction control, ABS, electronic stability control, wheel speeds, differential temperature, torque-vectoring paddle position, and others.

Based on this data, the controller, at operation 160, calculates a torque differential for each axle in which torque vectoring is to occur. Depending upon the vehicle and sensed conditions, this may include the rear axle, the front axle, or both. The torque differential is the torque difference commanded between the inside and outside wheels of the axle. As discussed above, the torque difference may be effectuated by increasing torque to the outside wheel and decreasing torque to the inside wheel through a reduced motor torque and/or braking (regenerative, friction, or both). Depending upon the embodiment, the controller may calculate multiple torque differentials. For example, in the ON/OFF embodiment the controller may calculate a torque differential that is either commanded or not based on paddle actuation. In the variable torque-vectoring embodiment, the controller may calculate a baseline torque differential and then calculate a final torque differential based on the amount of actuation of the paddle. The final torque differential may be equal to the baseline torque differential multiplied by a multiplier. The multiplier may be less than one for a first range of paddle positions to provide less torque vectoring and may be greater than one for a second range of positions to provide increased torque vectoring based on driver demand.

The calculated torque differential of operation 160 is then fed to operation 162. At operation 162, a torque arbitrator module determines how best to effectuate the desired torque differential between the inner and outer wheels. The torque arbitrator module 162 also receives the sensor data from operation 158, and based on the sense conditions, determines the motor-torque commands (both positive and negative) and friction-braking commands. Depending upon the magnitude of the torque differential and the sense conditions, the arbitrator module may command a an increased positive torque to the outside wheel and a negative torque to the inside wheel or may command an increased positive torque to the outside wheel and a reduced positive torque to the inside wheel. When a negative torque is commanded to the inside wheel, the arbitrator module also determines a torque split between the regenerative braking and the friction braking. The arbitrator module may also determine commands for the differential, e.g., commands for the differential 35.

At operation 164, the commands are issued to the various actuators and components according to the determinations of the torque arbitrator module at operation 162. The commands issued at operation 164 depend upon the components of the vehicle. In the example embodiment of FIG. 1, the commands may include torque commands to the motors 26, 34, commands to the differential 35, and/or commands to the friction brakes 42.

Figure 9:
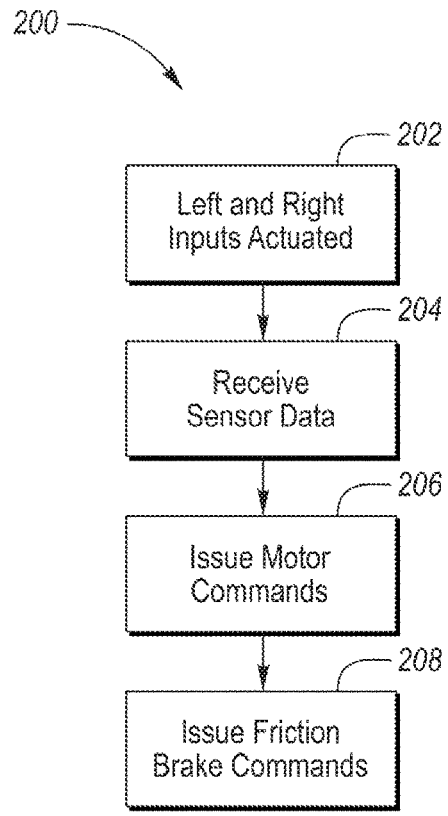
FIG. 9 is a flow chart of an algorithm for controlling manually activated regenerative braking.

FIG. 9 illustrates the regenerative braking controls 200 according to one or more embodiments. The controls begin in response to the left and right torque-vectoring inputs being actuated at operation 202. At operation 204, the controller receives sensor data. Based on the sensor data, motor commands are issued at operation 206. At operation 208, friction brake commands may also be issued depending upon the sensed conditions and the hardware of the vehicle.

The torque-vectoring control devices may also be used to request a drifting mode in one or more embodiments. The drifting mode, which is used on the track or in other closed-course driving, is a mode that produces heavy oversteer. The drift mode may be selected through a human-machine interface such as the main touchscreen or the like. When in drift mode, application of the torque-vectoring control devices results in the vehicle being placed into a drift condition. A vehicle may only include the drift mode and not torque vectoring. Alternatively, a vehicle may include torque vectoring and not drift mode.

Figure 10:
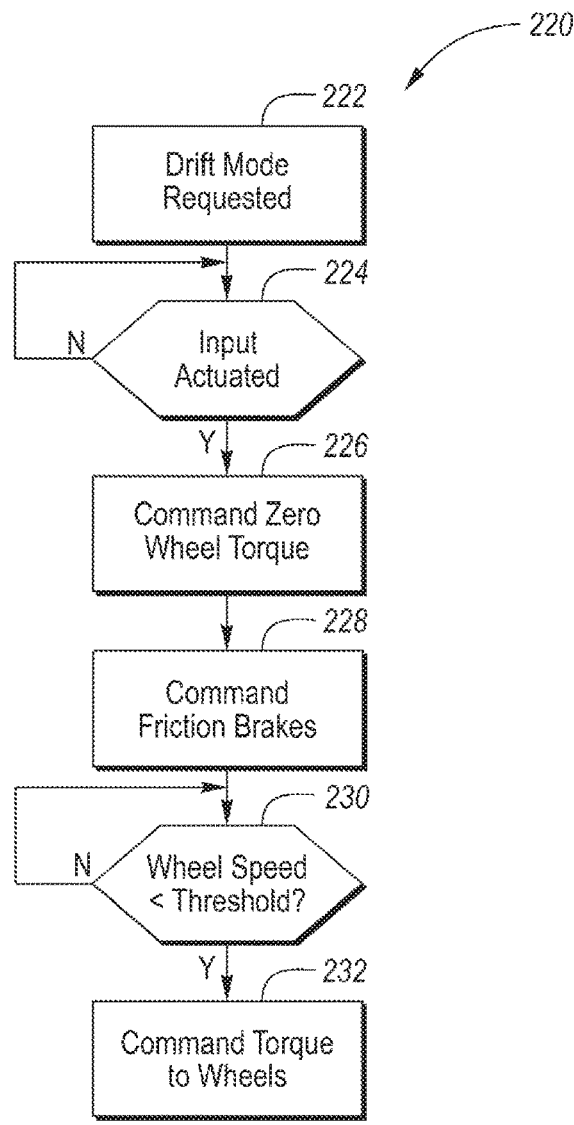
FIG. 10 is a flow chart of an algorithm for controlling manually activated drifting.

FIG. 10 illustrates example controls 220 for drift mode according to one or more embodiments. Control begins at operation 222 when the driver requests drift mode. In drift mode, the vehicle may operate substantially normally (some systems such as traction control and electronic stability control may be disabled in this mode) until the driver actuates one or more of the inputs, e.g., paddles. The controller monitors for actuation of the inputs at operation 224. Control passes to operation 226 in response to one or more of the inputs being actuated at operation 224. In operation 226, the controller commands zero torque to at least the rear wheels regardless of the driver-demanded torque from the accelerator pedal. That is, the actuator torque commands are overridden, and the wheel torques are reduced to zero. At operation 228, the controller commands engagement of the friction brakes associated with the rear axle to lock-up the rear tires and brake traction with the pavement. The amount of braking commanded at operation 228 may be a calculated value based on sensed conditions or may be the maximum braking torque. The rear brakes are engaged until the rear tires brake traction, e.g., the rear axles is placed in a skid. The brakes may be commanded for a predetermined amount of time estimated to induce lock-up, or alternatively (as shown), the controller may monitor for wheel speed. At operation 230, the controller determines if the wheel speed is less than a threshold value. If no, the rear brakes remain applied until the threshold wheel speed is achieved. If yes at operation 230, control passes to operation 232 and the controller commands torque to the wheels. The torque commanded to the wheels at operation 232 may be based on the driver-demanded torque.

The above-described manual torque vectoring, manual regenerative braking, and drift mode increase driver involvement with the vehicle to offset the reduced driver interaction associated with electric vehicles. By including one or more of these manual features, driver interaction can be increased to satisfy the needs of some drivers.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an axle including left and right wheels;
   a steering wheel;
   left and right driver-actuatable inputs operable to request left-side and right-side torque vectoring, respectively; and
   a controller programmed to:
     in response to the steering wheel being turned left and a driver requesting left-side torque vectoring via the left input, (i) calculate a first torque differential between the left and right wheels based on steering angle, accelerator-pedal position, vehicle speed, and yaw rate, and (ii) command torque to the left and right wheels based on the first torque differential, and
     in response to the steering wheel being turned right and the driver requesting right-side torque vectoring via the right input, (i) calculating a second torque differential between the left and right wheels based on steering angle, accelerator-pedal position, vehicle speed, and yaw rate, and (ii) command torque to the left and right wheels based on the second torque differential.

2. The vehicle of claim 1, wherein the left and right driver-actuatable inputs are paddles.

3. The vehicle of claim 2, wherein the paddles are mounted to the steering wheel.

4. The vehicle of claim 1, wherein the axle further includes left and right electric machines configured to drive the left and right wheels.

5. The vehicle of claim 4, wherein the command torque to the left and right wheels based on the first torque differential further includes commanding a positive torque to the right electric machine and commanding a negative torque to the left electric machine.

6. The vehicle of claim 4, wherein the controller is further programmed to, in response to both the left and right inputs being actuated, command negative torques to both of the left and right electric machines.

7. The vehicle of claim 1, wherein the axle further includes left and right friction brakes, and wherein the command torque to the left and right wheels based on the first torque differential further includes commanding a positive torque to the right wheel, commanding zero torque to the left wheel, and applying the left brake.

8. The vehicle of claim 1 further comprising a second axle including left and right wheels, wherein the controller is further programmed to:
   in response to the steering wheel being turned left and the driver requesting left-side torque vectoring via the left input, (i) calculate a third torque differential between the left and right wheels of the second axle based on the steering angle, the accelerator-pedal position, the vehicle speed, and the yaw rate, and (ii) command torque to the left and right wheels of the second axle based on the third torque differential, and
   in response to the steering wheel being turned right and the driver requesting right-side torque vectoring via the right input, (i) calculating a fourth torque differential between the left and right wheels of the second axle based on the steering angle, the accelerator-pedal position, the vehicle speed, and the yaw rate, and (ii) command torque to the left and right wheels based on the fourth torque differential.

9. The vehicle of claim 8, wherein the axle further includes left and right electric machines configured to drive the left and right wheels of the axle, and the second axle further includes second left and second right electric machines configured to drive the left and right wheels of the second axle.

10. The vehicle of claim 9, wherein the command torque to the left and right wheels based on the first torque differential further includes commanding a positive torque to the right electric machine and commanding a negative torque to the left electric machine, and wherein the command torque to the left and right wheels based on the third torque differential further includes commanding a positive torque to the second right electric machine and commanding a negative torque to the second left electric machine.

11. The vehicle of claim 1, wherein each of the left and right driver-actuatable inputs includes a released position, a fully actuated position, a plurality of intermediate positions, and a sensor configured to output a signal indicative of a position of the input.

12. The vehicle of claim 11, wherein the calculated the first and second torque differentials between the left and right wheels is further based on the signal.

13. The vehicle of claim 12, wherein the left and right driver-actuatable inputs are paddles mounted to the steering wheel.

14. A vehicle comprising:
   an axle including left and right wheels;
   left and right torque-vector control devices each including an actuator having a released position, a fully actuated position, and a plurality of intermediate positions; and
   a controller programmed to, in response to the vehicle turning and one of the actuators being actuated, command different torques to the left and right wheels to produce torque vectoring between the wheels, wherein a difference between the torques commanded to the wheels increases as the actuator moves toward the fully actuated position and decreases as the actuator moves toward the fully released position.

15. The vehicle of claim 14, wherein the actuators are paddles.

16. The vehicle of claim 14, wherein the command different torques to the left and right wheels to produce torque vectoring further includes (i) calculating a baseline torque differential between the wheels and (ii) modifying the baseline torque differential based on a position of the actuator.

17. The vehicle of claim 14, wherein the axle includes left and right electric machines configured to power the left and right wheels.

18. The vehicle of claim 14, wherein the axle includes an electric machine and a differential configured to route power from the electric machine to the left and right wheels such that each wheel can receive 0 to 100 percent of the power.

19. The vehicle of claim 14 further comprising a second axle including left and right wheels, and wherein the controller is further programmed to, in response to the vehicle turning and the one of the actuators being actuated, command different torques to the left and right wheels of the second axle to produce torque vectoring between the wheels, wherein a difference between the torques commanded to the wheels of the second axle increases as the actuator moves toward the fully actuated position and decreases as the actuator moves toward the fully released position.

\* \* \* \* \*